Feb. 6, 1951 F. A. JENKS 2,540,121
STEREOSCOPIC OBJECT LOCATING SYSTEM
Filed June 17, 1943 3 Sheets-Sheet 1
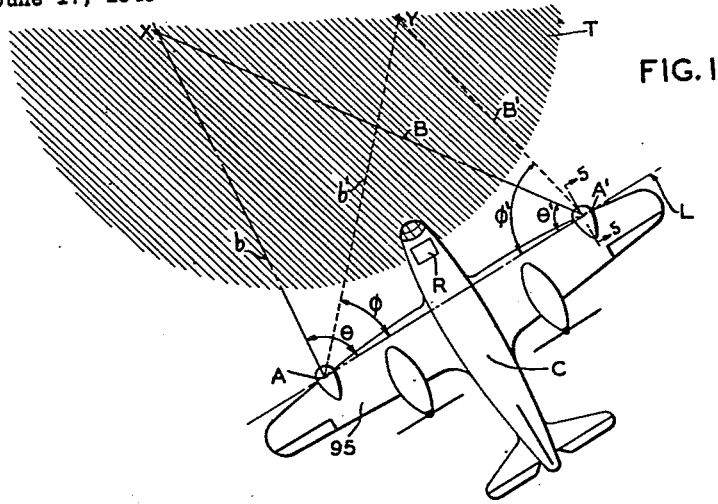
FIG. 1
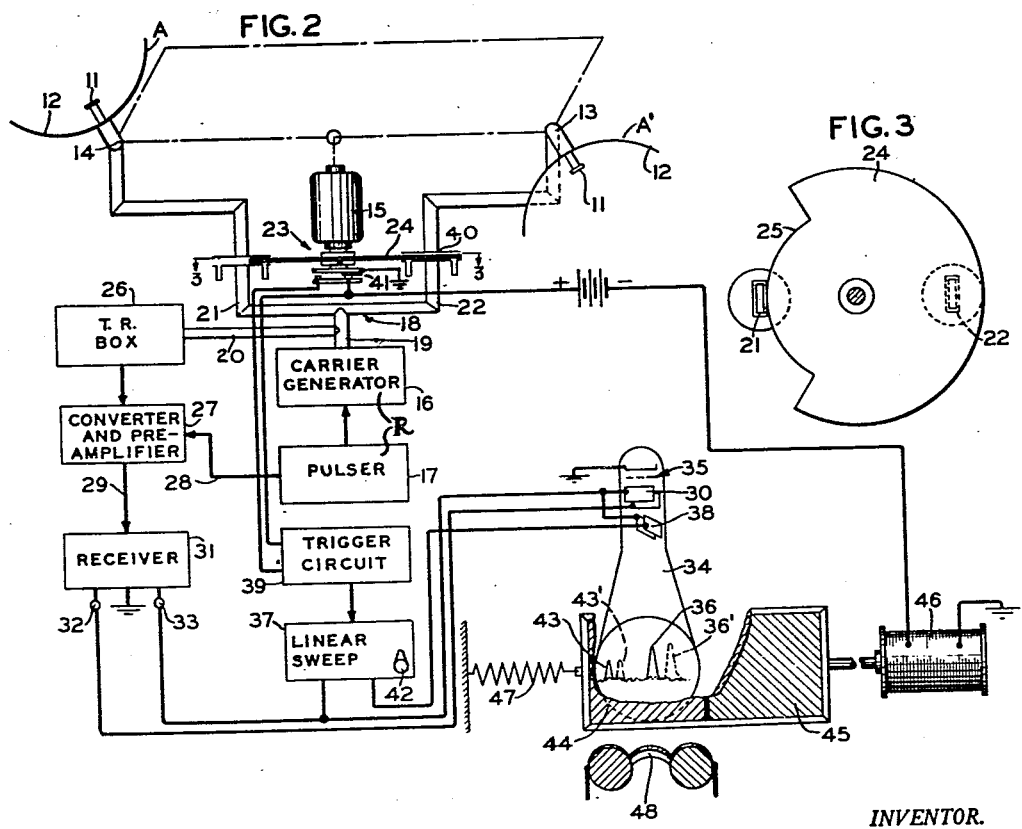
INVENTOR.
F. A. JENKS
BY Herbert H. Thompson
his ATTORNEY Feb. 6, 1951     F. A. JENKS     2,540,121
STEREOSCOPIC OBJECT LOCATING SYSTEM
Filed June 17, 1943     3 Sheets-Sheet 2
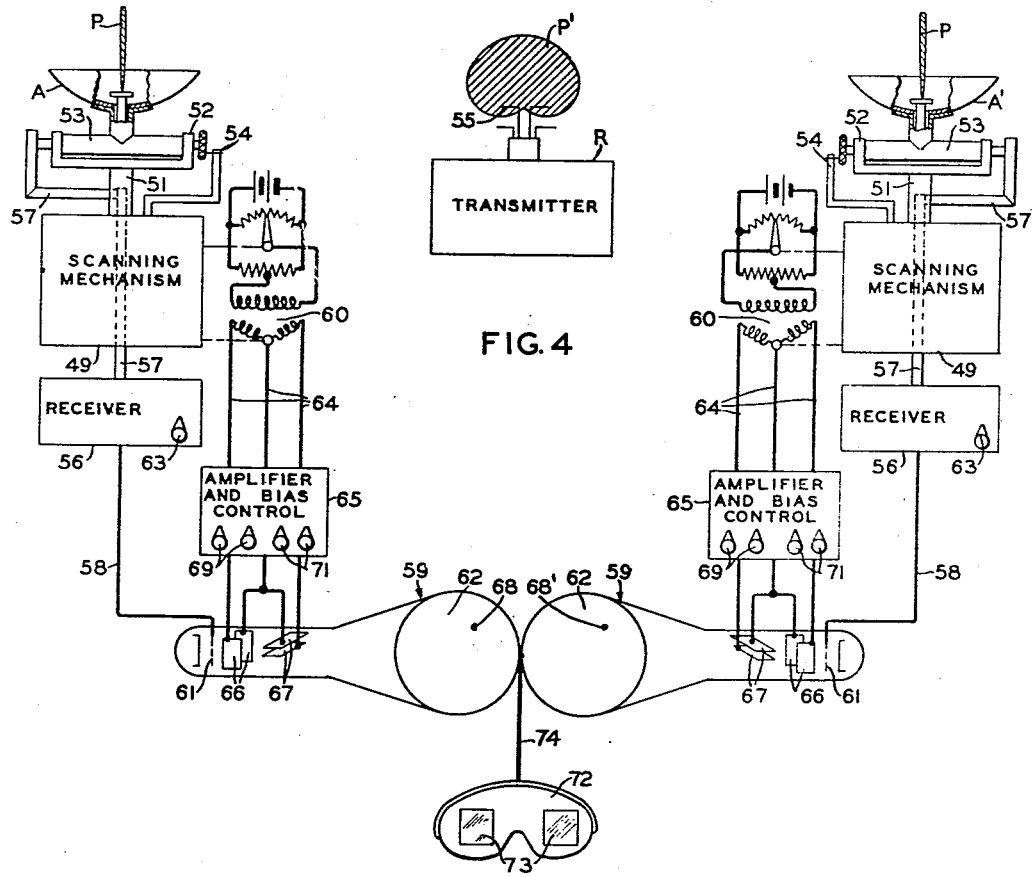
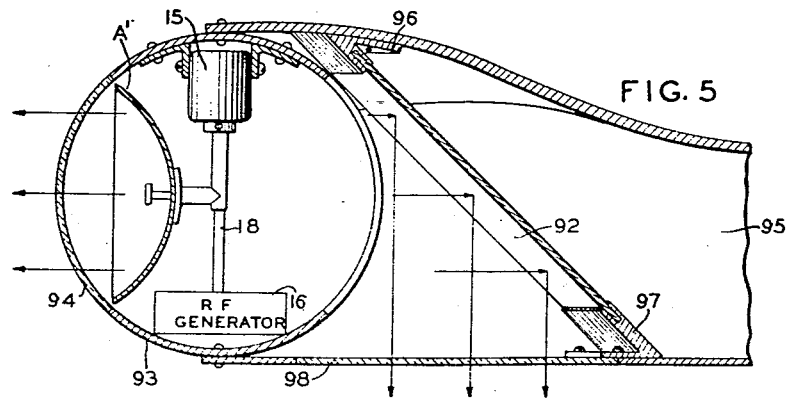
INVENTOR.
F. A. JENKS
BY
*Herbert P. Thompson*
his ATTORNEY

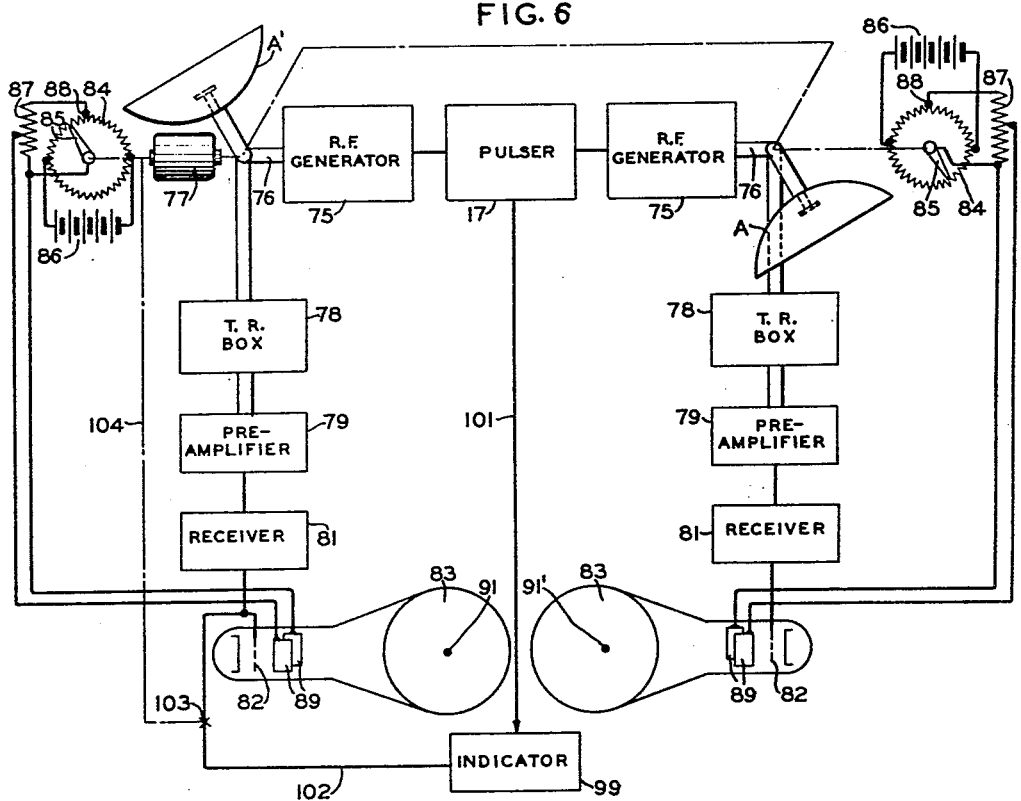

Patented Feb. 6, 1951

2,540,121

UNITED STATES PATENT OFFICE 2,540,121

STEREOSCOPIC OBJECT LOCATING SYSTEM

Frederic A. Jenks, Rockville Centre, N. Y., assignor to The Sperry Corporation, a corporation of Delaware Application June 17, 1943, Serial No. 491,165

26 Claims. (Cl. 343—11)

This invention relates to object detecting and locating systems and more especially to the formation of stereographs designating objects in space.

Electromagnetic energy has been used to irradiate objects and to determine the absolute distance of the object from, and its orientation relative to, the point of observation. Use also has been made of a pair of spaced antenna systems adapted to locate an object by the ordinary methods of triangulation. In all of the foregoing instances the data is presented to the observer on some form of indicator that precludes the observer from fully visualizing the range and bearing of the object.

By means of the present invention triangulation methods are employed with electromagnetic radiation to form stereoscopic images of the object in such a form as to present a fuller appreciation to the observer of the location of the object. In addition, the present system incorporates means for projecting electromagnetic radiation alternately onto two target areas by deflecting a radiant energy beam periodically from a continuously rotating antenna system.

The principal objects of the present invention are to provide an improved system for forming a stereoscopic indication of a remote object; to provide means for and methods of orienting a pair of spaced directivity patterns relative to an electromagnetically irradiated object, and to form stereoscopically displaced images in accordance with such orientation; to provide a system for scanning successively adjoining portions of a target area, and forming images in response to reflections from an object, which images are stereoscopically located in accordance with the instantaneous orientation of the respective patterns; to provide a system for scanning a first target area with a beam of electromagnetic energy during a portion of a cycle of movement of a directive antenna system, and diverting the beam during a portion of the time that the antenna moves in a regular manner to its original position; and to provide improved means for and methods of forming stereoscopic images in a radio object detecting system wherein the images formed by the left and right beams, respectively, are rendered visible only to the left and right eyes, respectively. These and other objects of the present invention will become more apparent from the following description and from the accompanying drawings, disclosing a number of embodiments and novel principles of the present invention.

Application S. N. 575,415, filed January 31, 1945, entitled Wave Guide Modulation Apparatus, in the name of the instant inventor, is a continuation-in-part of the present case.

In the drawings,

Fig. 1 is a schematic diagram illustrating various angular relationships between two objects and a pair of spaced directive antennas located on a moving craft;

Fig. 2 is a schematic arrangement of one form of apparatus that may be used to form stereoscopic images of remote objects;

Fig. 3 is a sectional view taken along the line 3—3 of Fig. 2, illustrating means for commutating energy to and from the respective antennas;

Fig. 4 is a schematic arrangement of the modified system for forming stereoscopic images, wherein alternate images are formed on separate screens;

Fig. 5 is a cross-sectional view taken on the line 5—5 of Fig. 1, illustrating the manner in which a rotating directive antenna may be made to deflect its energy downwardly during the portion of each cycle of rotation; and Fig. 6 is a schematic arrangement of a still further modified form of the invention, along the general lines of that shown in Fig. 1 but wherein use is made of two indicators.

Generally speaking, the invention comprehends orienting a pair of electromagnetic directivity patterns onto an object from points spaced along a stereoscopic base line to provide an effective interocular distance. Images are formed in response to energy reflected from the object, and the images are rendered visible to the left and right eyes, respectively, of the observer in true stereoscopic relation, in accordance with the instantaneous orientation of the respective patterns. A fuller appreciation of the invention and its method of operation will be apparent from the following detailed description.

In Fig. 1 the shaded zone represents an effective target area T within which obstacles such as objects X and Y may be detected. Directive antennas A and A' are disposed in separated relation along a stereoscopic base line L to provide an effective interocular distance. Each of the antennas A, A' is adapted to project a directivity pattern of electromagnetic energy, the axes of which patterns or beams are symbolized by the lines b and B in Fig. 1. These lines form base angles θ and θ' with the base line L when the beams or patterns are focused on a distant object X within the target area T. Both the range and bearing of the object X relative to the point of observation on the craft C may be determined and represented in true perspective stereoscopically, in response to the orientation of the lines $b$, B as expressed by the angles $\theta$, $\theta'$. The various means employed for producing this effect will hereinafter more fully appear in conjunction with a detailed description of the different embodiments of the invention.

Although the beams $b$, B may be oriented manually until the desired intersection at the object is attained, it is more desirable, especially where an observation is made from a moving craft, to scan the target area with the respective beams and to form an image whenever a reflection of energy indicates that the pattern is focused on the object. Thus, the beams $b$, B both may be oscillated or rotated in a convenient fashion so that each periodically scans the target area. The left and right beams $b$, B are capable of forming left-eye and right-eye images, respectively, designating irradiated objects, and the positions observed by the respective beams correspond to the beam positions when they converge on each object. Thus, in Fig. 1 a left-eye image may be positioned in accordance with the angle $\theta$ while a corresponding right-eye image may be positioned in accordance with the angle $\theta'$. A second pair of images may be formed by the beams moving to the positions $b'$, B', respectively, located in accordance with base angles $\phi$ and $\phi'$, respectively, thereby designating a second object Y within the target area. It will be understood that the closeness of objects X and Y to the craft C has been exaggerated to clarify the angular relationship between the parts.

In order to obtain the information necessary for proper stereoscopic displacement of the images, it is necessary only that use be made of directive antennas at points separated by the interocular distance, and it is immaterial whether these antennas radiate collimated electromagnetic energy, or direct a receptivity pattern into space, or both. It will be apparent that the base angles formed between the beams and the base line L provide the data for stereoscopically positioning the images, and this positional data may be obtained whether the antennas A and A' are receivers or radiators of electromagnetic energy. Thus, if the objects were irradiated with electromagnetic energy by any convenient outside source such as a broad-beam transmitter or radiator R, reflections from the object X will be obtained when the lines forming the axes of receptivity patterns from receiving antennas A, A' are disposed in the positions $b$, B, as shown in Fig. 1. Under these conditions the transmitter R may be considered as projecting a beam of energy forwardly of the craft C throughout the general area T indicated in Fig. 1 by the shaded zone. It is obvious from the reciprocity theorem that similar results may be obtained if the directive antennas A, A' comprise directive radiators while the transmitter R is replaced by a broadly directive or omni-directional receiver. In either case, an image is formed in response to reflected energy appearing in the receiver while the stereoscopic location of the images is obtained from the orientation of the beams, as will appear.

Referring now more especially to Fig. 2, each of the antennas A and A' includes a radiating element 11 properly disposed with respect to the focus of a parabolic reflector 12. The antennas are angularly displaced, e. g., by oscillation or rotation about spaced axes 13 and 14, as by means of a motor 15. In the arrangement of Fig. 2, a single generator 16 of radio frequency energy energizes both antennas in sequence; accordingly, the antennas A, A' are mechanically phase-displaced so that only one antenna is directed on the target area at any one time. As shown in Fig. 2, the antennas may be phased by disposing the reflectors 180° out of phase, e. g., so that when one faces north, the other faces south.

The arrangement of Fig. 2 is particularly adapted to the pulse type system, that is to say, a system wherein the electromagnetic energy is radiated during short spaced intervals. A pulser 17 comprising an oscillator having a frequency of the order of 2000 cycles per second may be used to key the generator 16 in order to produce ultra high frequency pulses at the period of the oscillator 17. The duration of the pulses may be regulated according to the shape of the wave from the oscillator 17, and generally is of the order of 1 microsecond or less, the unusually short interval being obtained by sharpening and otherwise shaping the wave form from the pulser or oscillator 17 in accordance with standard practice.

The radio frequency energy is conducted from the generator 16 alternately to the respective antennas in any suitable manner, preferably through the use of a wave guide 18 having a feeder 19 and branches 21 and 22 extending from a junction with feeder 19. Commutating means 23 may comprise a suitable gate valve consisting of a disc 24, having a notch or window 25, and adapted when rotated to interrupt the flow of energy alternately through the branches 21 and 22. As shown in Figs. 2 and 3, the disc may rotate so that its periphery intermittently extends within openings in the passages 21 and 22, cutting off the wave guide to the flow of energy. Choke joints 40 comprising a lower annular flanged member composed of a bent half-wave section, and an upper disc member, cooperate to provide a low impedance point about the opening in each wave guide and a high impedance region about the periphery of the disc, thereby inhibiting the escape of energy from between the members. Energy flows through the branches 21 and 22 whenever the notch 25 clears the wave guide passage, the time interval of energy flow being a function of the length of the notch 25 and the speed of rotation. By attaching the disc 24 directly to the motor 15 in the manner shown in Fig. 2, the flow of energy may be correlated with the positions of the respective antennas A, A', whereby ultra high frequency pulses may radiate from the antennas alternately as each scans the target area.

If an object X or Y should be located so as to be irradiated by the electromagnetic energy, energy will be reflected from the object to the antennas along the lines $b$, B or $b'$, B'. This energy may be used to energize an image-producing device such as an oscilloscope, as will appear, to reveal the presence of an object. The reflected energy passes in the reverse direction through the branches 21, 22, respectively, during the intervals following the termination of each pulse. The received signals pass to a converter and intermediate-frequency pre-amplifier 27. An amplitude limited 26, often commonly known as a T-R box, protects the receiving equipment from pulses directly from the transmitter. The T-R box comprises a pair of electrodes in a chamber containing a gas ionizable by the pulses from the generator 16, thereby providing substantially a short circuit between the electrodes. The electrical length of the portion 20 of the wave guide 18 extending from the feeder 19 to the T-R box is such that the low impedance within the T-R box 26 occurring when the device is ionized, appears across the opening of portion 20, at its junction with feeder 19, and thereby precludes carrier energy from entering portion 20. Energy reflected from the objects X and Y, however, reaches the T-R box between pulses while the gas is in an un-ionized condition, and since the amplitude of the reflected signals is insufficient to cause ionization, the signals pass through the box 26 substantially unimpeded. If desired, a connection 28 may extend from the pulser 17 to the pre-amplifier 27 to bias the pre-amplifier to cut-off during the brief moment that the radio frequency pulse is transmitted, thereby precluding operation of the pre-amplifier by spurious signals directly from the generator 16.

Signals from the pre-amplifier 27 pass through connection 29 to receiver 31, the output terminals 32 and 33 of which connect with an image-forming device 34, typically a cathode ray oscilloscope. Various well-known methods may be employed to transform the receiver signal to a visible image. However, with the arrangement shown in Fig. 2, an electron beam emanating from an electron gun 35 may be deflected momentarily to form a peak or pip 36 in the trace, representing an object within the target area. As shown in Fig. 2, this is conveniently effected by connecting the terminals 32 and 33 to the vertical deflection elements 30 of the oscilloscope 34.

Stereoscopic positioning of the images as a function of the base angles such as $\theta$ and $\theta'$ may be obtained by laterally positioning the images in accordance with the instantaneous positions of the beams $b$, B. Numerous methods are known by which the orientation of the antennas A, A' and accordingly the angular disposition of the beam $b$, B can be correlated with a transverse displacement of the corresponding images formed by the oscilloscope 34. A simple method for obtaining the lateral displacement is shown in Fig. 2 and comprises a sweep circuit 37 adapted to operate on the horizontal deflection elements 38 of the tube 34 so as to sweep the cathode ray horizontally across the screen in coordination with the motion of the respective antennas. By providing a circuit 37 having substantially linear characteristics, the horizontal deflection corresponds with the displacement of the beams $b$, B, when the latter rotate at uniform angular velocity. By synchronizing the circuit 37 with the motion of the antennas A, A', the images may be displaced in accordance with the angles $\theta$ and $\theta'$. The synchronizing action may be obtained by controlling the sweep circuit 37 with a trigger circuit 39, which in turn is controlled by a switch 41 operated by the motor 15. The switch 41 is provided with adjustable contacts that may be located at points corresponding with the position of the respective antennas when each reaches the initial scanning position. For example, assuming that both the antennas and the sweep circuit operate from left to right when facing the target area and the screen, respectively, the contacts of the switch 41 may be arranged so as to energize the trigger circuit at the instant that the antennas A and A' each arrives at the left edge of the target area. Thus, the cathode ray is swept horizontally along the screen twice during each complete revolution of the antenna system, and the bearing of any reflecting object in the target area is indicated by a pip designating the angular relation of the object first to the antenna A and then to the antenna A'. The sweep circuit 37 may be provided with a control knob 42 to assist in coordinating the motion of the beams with the motion of the cathode ray of the oscilloscope 34, that is, to confine the limits of the horizontal sweep.

If an object is within the normal operating range of the instrument, the bearing of the object relative to antenna A will differ from the bearing relative to the antenna A', and in addition to the image 36 formed by the reflection along one beam, a second image 36' will be formed displaced stereoscopically relative to the image 36 in accordance with the difference in the two bearing determinations. Similar additional images 43, 43' will be formed if two objects are present in the target area, the location and separation distance of the images being a function of the angles which the respective beams form with the base line L.

The images 36, 36' and 43, 43' cannot be observed stereoscopically unless the respective images are visible only to the separate left or right eye of the observer. In Fig. 2 this result is obtained by extinguishing the view to the left and right eye alternately of the observer, in synchronism with the formation of the left and right eye images, so that only one of each pair of images is visible to each eye of the observer. Various types of devices are known for this purpose, though use is herein made of polarizing screens 44 and 45, oriented so that the respective planes of polarization are displaced by 90°. The screens are reciprocated or otherwise shifted across the front of the face of the oscilloscope 34 so that the resulting images are plane polarized successively at angles 90° out of phase. The motion of the screens 44, 45 may be synchronized with the formation of the left-eye and right-eye images by shifting the screens 44 and 45 at the beginning of each linear sweep. This may be accomplished readily by translating the screens in unison, as by a solenoid 46 operated by one of the contacts of switch 41 so as to place the left-hand screen 44 in operating position at the start of one sweep cycle, and to release the screens so that a spring 47 may place the right-hand screen in operating position at the beginning of the succeeding sweep cycle. The switch 41 is adapted to maintain the circuit to the solenoid closed during complete alternate sweep cycles. An observer obtains a stereoscopic effect by observing the images 36, 36' and 43, 43' through a pair of polarizing lenses or spectacles 48 oriented relative to the screens 44 and 45 so as to provide complete extinction of vision to the left and right eyes of the observer as the screens 44 and 45 move to the left and right positions, respectively.

Accordingly, the images formed by pips in the trace formed by oscilloscope 34 are located stereoscopically and appear in true perspective relation to one another, upon observing the left-eye and right-eye images separately. The lateral displacement from an initial left-hand index on the screen or face of the oscilliscope 34 is a measure of the bearing of the object in azimuth, and the displacement between corresponding left and right images is a function of the observer's distance from the observing mechanism. The height of the pip depends on both the proximity of the object, its size, and its reflectivity, so that with the distance determined stereoscopically, the height of the pip provides the additional information of the object's reflectivity. In the ordinary case, the heights of the pip designating respectively objects X and Y are sufficiently different that they avoid any possible mismatching of the images by the observer. Although the eyes of the observer tend to correlate the images in proper pairs, the tendency is enhanced by the difference in the amplitude of the pips or images of different objects. Thus, it is highly improbable that the observer will attempt to match images 43 and 36 stereoscopically instead of the images 43, 43'.

A slightly modified arrangement has been shown in Fig. 4 to illustrate the manner in which various elements of the combination may be altered without departing from the scope of the invention. It will be understood that the various forms of the invention shown in Figs. 2, 4, and 6 are illustrative of various combinations that may be made with elements of the apparatus, and it is fully comprehended that the various elements or units may be interchanged one with the other to produce any desired combination. The principal differences found in Fig. 4 reside in the use of continuous wave transmission instead of intermittent energy pulses, and in the use of spiral conical scanning to provide positioning of the image in elevation as well as in azimuth. Additionally, the Fig. 4 arrangement utilizes a transmitter separate from the receiving antennas, and uses separate screens for the formation of the stereoscopically disposed images, rendering it easier for the observer to obtain stereoscopic effects. The same reference character are used to designate corresponding parts.

Referring now to Fig. 4 in greater detail, the apparatus comprises antennas A and A' located as shown in Fig. 1 at points separated by an effective interocular distance. The antennas are both oscillated and/or rotated to sweep a directivity pattern P cyclically through the target area. As shown in Fig. 4, scanning mechanism 49 consisting of a prime mover and the necessary transmission apparatus (not shown) rotates the antennas by means of hollow shaft 51 and supporting yoke 52. The antennas A, A' are each mounted on a hollow spindle 53 pivotally held in the yoke 52 and oscillated about the axis of the spindle by means of a crank 54. Accordingly, antenna A and A' each is subjected to a combined rotary motion about a first axis and an oscillatory or nodding motion about a second axis perpendicular to the first axis. The rotational speed may be of the order of 20 R. P. S. while the nodding motion may be of the order of 2 cycles per second. Thus, the axis of pattern P defines a conical surface of gradually increasing apex angle, whereby successive portions of the target area are intersected.

All objects within the target area may be irradiated continuously by a transmitter or radiator R, the radiation pattern P' from which is broad enough to include the entire area to be scanned. Use may be made of an irradiating dipole 55 as part of an array providing the necessary broad pattern, typically a cardioid, as represented by the shaded area P' in Fig. 4.

It will be apparent that the antennas A, A' will detect reflections from irradiated objects whenever the patterns P become focused on the objects, at which time reflected energy will be received by the antennas A, A' for the formation of images located in accordance with the instantaneous orientation of the receiving antennas.

The reflected energy is conducted from the receiving antennas to the receivers 56 in any convenient manner, e. g., through a wave guide 57, equipped with rotating joints in accordance with standard practice wherever there is relative rotary motion between the parts. The signal from the receiver may be passed along connection 58 to the control grid of a cathode ray oscilloscope 59 normally biased to cut-off. The receiver signal energizes the control grid 61 and causes a stream of electrons to be projected onto the screen 62 of the tube. A gain control 63 on the receiver 56 permits adjustment of the signal strength of the receiver and provides a sensitivity control, since it may adjust the system so that the cathode ray stream or electron beam is inactive unless substantially the full signal intensity corresponding to the axial region of the pattern P is received. The control 63 thus provides a focussing control, whereby the orientation of the beam and the operation of the cathode ray indicator may be correlated.

The scanning mechanism 49 includes a two-phase generator 60, rotated in synchronism with the antennas, the voltage amplitude of which varies substantially sinusoidally in accordance with the nod motion of the antenna introduced by crank 54. This result is obtained simply by varying the field excitation of the two-phase generator potentiometrically in accordance with the crank motion, so that when the antenna A is in the axial position, the voltage is zero, and when the antenna is at the extreme nod position, the voltage is at its maximum. The fluctuating two-phase voltages are fed through wires 64 to an amplifier and bias control 65; the amplified voltages are applied in phase quadrature to the respective horizontal deflection elements 66 and vertical deflection elements 67 of an oscilloscope 59. The effect of the two-phase voltages on the cathode ray stream is to form a circular trace on the screen 62, the radius of which varies from zero to maximum in synchronism with the nod motion of the antenna A. Each circular trace is formed by a rotating spot, the instantaneous position of which designates the orientation of the beam P, as determined by the radius vector representing the geometric sum of the components of the two-phase generator 60. Since the tube 62 normally is biased to cut-off and the stream of electrons flows only at the instant that a reflection is received, the control grid and the deflecting elements of the tube 59 cooperate to form an image 68 on the tube corresponding in position to the position of the object relative to the antenna A. Although the foregoing receiving apparatus has been described in connection with only one of the antennas A, it is understood that an identical apparatus is provided for the antenna A'. Hence, a right-eye image 68' is positioned on its screen in a position designating the bearing of the object relative to the antenna A'. The position of the images 68, 68' relative to their respective screens will differ slightly by virtue of a lateral displacement of the antennas A, A', thus providing the stereoscopic positioning necessary for perspective and distance effects.

Inequalities in the deflecting voltages produced in each amplifier 65 may be balanced out by gain controls 69 for each phase of the circular sweep voltage. Likewise, the initial centering of the images in horizontal and vertical planes may be adjusted by bias control knobs 71. Since the respective images are formed on separate screens, they may be viewed by the observer through a simple stereoscope 72 comprising a pair of oculars 73, adapting each eye to focus on the corresponding image, and a partition 74 extending vertically between the respective lines of sight to preclude interference between the images.

The operation of the device shown in Fig. 4 is believed obvious from the foregoing description. It will be apparent that the images 68, 68' will be oriented stereoscopically on the respective screens and will impart the proper distance effects to the observer, since their positions are determined by the instantaneous orientations of the pattern P. Some measure of size or reflecting power of the object may be imparted by the voltage applied to the control grid, whereby strong reflections produce bright images, thereby assisting in rendering said images more distinct from weaker images resulting from lower voltages applied to the control grid. Since the objects are irradiated constantly, the antennas A and A' need not be operated in synchronism, though in the interests of symmetry and design and balance in operation, synchronous operation may be desirable. It is obvious also that the radiator R may be replaced by an omni-directional receiver R, and that the objects may be irradiated by the highly directive antennas A, A' projecting radio frequency energy, in which case the grids of the oscilloscope 59 may be controlled in a suitable manner from such receiver, while the image positions are determined by the orientation of the patterns P, as in the previous case.

Referring now to Fig. 6, a modified form of the invention comprises a pulsing system of the general type shown in Fig. 2 wherein each antenna A, A' is provided with its own source of radio frequency energy keyed by a common pulser 17. Each radio frequency generator 75, typically a magnetron oscillator, provides pulses of energy to the antennas A, A' through wave guides 76. The antennas are rotated in synchronism as by a motor 77, each antenna preferably being rotated recurrently through a complete arc of 360°. The antennas may be mechanically angularly displaced, e. g., by being located 180° out of phase so as to preclude reflections in one antenna of energy radiated by the other antenna. The received energy passes through a T-R box 78, a pre-amplifier 79, and a receiver 81, all as previously described, the received signal being applied to the control grid 82 of each of a pair of cathode ray tubes 83, thereby keying the tube from the cut-off condition and providing a stream of electrons at the instant that energy is received from an irradiated object. The object position as indicated on each tube is a function of the position of each of the antennas A, A' at the moment the reflected energy is received. The position in azimuth may be designated on the tube by providing a suitable sweep circuit of the general type described in connection with Fig. 2. As shown in Fig. 6, such sweep circuit may comprise a potentiometer 84 having a pointer or sliding contact 85 rotatable by the motor 77 in synchronism with the rotation of the antenna system. A battery or similar source 86 applies a steady unidirectional voltage across the potentiometer. A second potentiometer 87 permits selecting an adjustable portion of the voltage between the contact 85 and a center tap connection 88 for application to the horizontal deflection plates 89 of the tube 83. The potentiometer 87 may be adjusted until the sweep of the antennas A and A' corresponds with the sweep of the electron stream across a horizontal diameter of the tube, the back trace being eliminated, if desired.

Accordingly, images 91 and 91' are formed on the respective tubes according to the location of the object, while the images are displaced relative to one another according to the distance of the object.

It will be noted that since each antenna is provided with a separate radio frequency generator, each antenna radiates power during a complete cycle of rotation. A portion of this energy may be utilized to provide an indication of terrain clearance by projecting the energy downwardly after the antenna has scanned the target area. This might be done by directing the antenna downwardly during a portion of its return movement to the initial scanning position, but since this necessitates a change in the normal rotary movement of the antenna, it is proposed that a reflector 92 of the general type shown in Fig. 5 be interposed in the path of the beam so as to reflect the beam downwardly during the return motion of the antenna.

As more clearly indicated in Fig. 5, the antenna A' is rotatable by a motor 15 with energy provided by a generator 16. The entire assembly may be mounted within a generally spherical housing 93 having an electromagnetic-permeable portion or window 94 facing the area to be scanned. The housing 93 and mirror 92 are built as an integral structure within the wing 95 as shown. The reflector 92 may be tilted about a vertical axis slightly from the longitudinal axis of the wing and may be supported by upper brackets 96 and lower brackets 97. The portion directly beneath the reflector 92 may comprise an energy-permeable window 98 of wood or dielectric material.

Accordingly, as the reflector A' rotates, a portion of the energy is reflected downwardly toward the ground for a minor portion of each cycle, and the reflection of energy along the same path provides a signal from the receiver fed by antenna A'. The terrain clearance distance may be determined as a measure of the time required for the energy to travel to the ground and back. An indicator 99 (Fig. 6) is useful for the purpose and comprises any suitable form of sweep circuit mechanism or phase comparator mechanism providing a reading of the time interval between the transmission of the pulse and the reception of a reflection from the ground. The readings are obtainable on the indicator 99 by comparing the time between the energy flow from the pulser through wire 101, and the flow of energy from the receiver 81 through wire 102. A switch 103 operated through mechanical connection 104 by motor 77 renders the indicator 99 inoperative during the portion of the cycle when the antenna A' is facing the normal target area. Thus, it is impossible for the indicator to be operated except by terrain clearance signals produced by reflections of energy from the ground and directed to the antenna A' by reflector 92.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for irradiating objects with electromagnetic energy, comprising a source of electromagnetic energy, a directive antenna for collimating said energy, means for cyclically shifting said antenna about a regular course, so as to sweep said collimated energy along a first target area during a portion of each cycle, and directive means positioned in the path of said collimated energy during the remaining portion of each cycle, so as to directively deflect said energy without affecting the regular motion of said antenna.

2. Apparatus for irradiating objects with electromagnetic energy, comprising a source of electromagnetic energy, a directive antenna for collimating said energy, means for rotating said antenna so as to sweep said collimated energy in a complete arc a portion of which encompasses a first target area, and a director disposed in the path of said collimated energy as said energy passes through a remaining portion of said arc, for directively deflecting said collimated energy toward a second target area.

3. In a method of observing a remote object, the steps comprising radiating beams of electromagnetic energy from discreet points spaced along a base line, directing said beams onto said remote objects, forming a plurality of separate images for said object, and positioning said respective images in accordance with the orientation of said respective beams.

4. A method of detecting and viewing objects located in a target area, comprising radiating beams of electromagnetic energy from points spaced along a stereoscopic base line, sweeping said beams through said target area, forming a plurality of separate images in response to reflections of energy from each of said objects, locating said separate images as a function of the corresponding instantaneous angular positions of said beams relative to said base line, and merging with separate eyes the images formed by the respective beams to form one image.

5. A method of forming images of an object located in a target area, comprising radiating beams of electromagnetic energy from points spaced along a stereoscopic base line, sweeping said beams through said target area to irradiate said object and forming stereoscopic images of said object in accordance with reflections of electromagnetic energy therefrom.

6. A method of forming images of an object located in a target area, comprising radiating beams of electromagnetic energy from points spaced along a stereoscopic base line, sweeping said beams through said target area to irradiate said object and forming stereoscopic images of said object in accordance with the instantaneous positions of the respective beams at the moment said object is irradiated by said beams.

7. A method of forming stereoscopic images of an object, comprising irradiating said object with two beams of electromagnetic energy emanating from points spaced along an effective interocular line, forming images of said object, and stereoscopically locating said images in accordance with the orientation of said respective beams.

8. A method of forming stereoscopic images of an object, comprising irradiating said object alternately with two beams of electromagnetic energy emanating from points spaced along an effective interocular line, forming images of said object, and stereoscopically locating said images in accordance with the orientation of said respective beams and rendering images formed by each beam visible to only one eye of the observer.

9. A method of forming images of an object located in a target area, comprising radiating beams of electromagnetic energy from points spaced along a stereoscopic base line, sweeping said beams through said target area to irradiate said object, and forming stereoscopic images of said object in accordance with reflections of electromagnetic energy therefrom, said beams being swept alternately through said area to form images in response to reflections of one and then the other of said beams.

10. A method of forming images of remote objects comprising the steps generating a pair of directive beams, rotating said pair of directive beams so as to sweep through a predetermined target area containing said objects, mechanically phasing said respectve beams so that no more than one of said beams is directed toward said target area at a time, irradiating said objects, forming images in response to reflections of energy from said irradiated objects within said target area, and locating said images stereoscopically in accordance with the orientation of the respective beams when said objects are irradiated.

11. Stereoscopic apparatus comprising a pair of directive radiant energy antennas disposed at points separated by an effective interocular distance, means for angularly shifting said antennas so as to locate the directive radiation pattern of each of said antennas on a remote object, means for forming images designating said object, and means for stereoscopically displacing said images in accordance with the orientation of each of said antennas.

12. Steroscopic apparatus comprising directive antenna means for radiating beams of electromagnetic energy from points spaced along a stereoscopic base line, means for shifting said beams so as to irradiate successive portions of a target area, a screen, means for forming images on said screen in response to reflections along said beam of energy from objects within said target area, and means for stereoscopically locating said images in accordance with the orientation of said beams.

13. Stereoscopic apparatus comprising directive antenna means for radiating beams of electromagnetic energy from points spaced along a stereoscopic base line, means for shifting said beams so as to irradiate successive portions of a target area, a screen, means for forming images on said screen in response to reflections along said beam of energy from objects within said target area, means for stereoscopically displacing said images in accordance with the orientation of said beams, and means for rendering the stereoscopic images visible to only the respective left and right eyes of an observer.

14. Stereoscopic apparatus comprising directive antenna means for radiating beams of electromagnetic energy from points spaced along a stereoscopic base line, means for shifting said beams so as to irradiate successive portions of a target area, a screen, and means for forming stereoscopically displaced images on said screen in response to reflections of energy along said beam from objects irradiated by said beam.

15. Stereoscopic apparatus for forming images of a distant object, comprising means for irradiating said object with beams of electromagnetic energy originating from points spaced apart by an effective interocular distance, and oscillograph means for forming stereoscopic images of said object in accordance with the orientation of said respective beams.

16. Stereoscopic apparatus comprising directive antenna means for radiating beams of electromagnetic energy from points spaced apart by an effective interocular distance, means for rotating said beams synchronously in phase-displaced relation so that said beams alternately irradiate a target area, means for forming images designating objects within said target area in response to reflections of energy from said objects along each of said beams, and means for stereoscopically locating the respective images as left-eye and right-eye images in accordance with the orientation of the respective beams.

17. Apparatus as claimed in claim 16 wherein said rotating means completes a cycle within the persistence of vision period.

18. Object detection apparatus comprising a source of radio frequency energy, means for projecting said energy forwardly of an aircraft, means for forming images in response to reflections of said energy from objects lying forwardly of said aircraft, means for directively deflecting energy from said projecting means intermittently downward from said aircraft toward the ground, means for measuring the travel time of said downwardly-directed energy, and means for indicating ground clearance as a function of said travel time.

19. Stereoscopic apparatus for forming a stereographic representation of a distant object irradiated by electromagnetic energy, comprising directive receiving antennas located at points spaced apart by an effective interocular distance, means for determining the orientation of said antennas at which the directively pattern of each is focussed on said object, means for forming images representing said object, and means for stereoscopically displacing said images as a function of the orientation of said antennas.

20. Stereoscopic apparatus for forming a stereographic representation of a distant object irradiated by electromagnetic energy, comprising directive receiving antennas located at points spaced apart by an effective interocular distance, means for determining the orientation of said antennas at which the directivity pattern of each is focussed on said object, oscillographic means for forming images representing said object, said oscillographic means including deflecting means for stereoscopically displacing said images as a function of the positions of said respective antennas relative to said interocular line.

21. Stereoscopic apparatus for detecting and representing a distant object irradiated by electromagnetic energy, comprising a pair of directive receiving antenna structures located at points spaced apart by an effective interocular distance, means for recurrently shifting the directivity pattern of each of said structures to scan successively adjoining areas, image forming means operative when said patterns are aligned with a reflecting object to form images representing said object, and means responsive to the orientation of said beams when in said aligned positions for stereoscopically displacing said images.

22. Stereoscopic apparatus for detecting and representing a distant object irradiated by electromagnetic energy, comprising a pair of directive receiving antenna structures located at points spaced apart by an effective interocular distance, means for recurrently shifting the directivity pattern of each of said structures to scan successively adjoining areas, a first image-forming means responsive to energy reflected from said object when the first of said patterns projects toward said object, a second image-forming means responsive to energy reflected from said object when the second of said patterns projects toward said object, and means responsive to the orientation of each pattern for positioning the images stereoscopically.

23. Stereoscopic apparatus for detecting and representing a distant object, comprising an electromagnetic energy radiator, a pair of directive antennas spaced apart by an effective interocular distance, image-forming means operative when the respective antennas are focussed on an energy-reflecting object, and means for locating such images in adjoining stereoscopically-displaced relation in accordance with the orientation of said antennas when in the focussed position.

24. Stereoscopic apparatus for detecting and representing a distant object, comprising means for irradiating said object with electromagnetic energy and receiving reflected energy therefrom, said means including a pair of directive antennas spaced apart by an effective interocular distance, means for determining the orientation of said respective antennas relative to said object, means for forming images designating said object, and means for stereoscopically locating said images according to said orientation.

25. Stereoscopic apparatus for detecting and representing a distant object, comprising means for irradiating said object with electromagnetic energy and receiving reflected energy therefrom, said means including a pair of directive antennas spaced apart by an effective interocular distance, means for scanning said antennas so as to sweep the directivity pattern thereof through successively adjoining portions of a target area, means for producing an image at the moment each of said patterns is focussed on said object, and means for stereoscopically locating the respective images in accordance with the instantaneous orientation of said patterns.

26. A method of stereoscopically observing an object irradiated by a pair of directive radio beams, comprising directing said pair of directive beams from displaced points along a base line until their receptivity patterns are aligned with the object, forming images representing said object, and stereoscopically locating said images according to the orientation of said directive beams.

FREDERIC A. JENKS.

REFERENCES CITED

The following references are of record in the file of this patent:

UNITED STATES PATENTS

| Number | Name | Date |
|---|---|---|
| 2,129,712 | Southworth | Sept. 13, 1938 |
| 2,143,035 | Smith | Jan. 10, 1939 |
| 2,189,549 | Hershberger | Feb. 6, 1940 |
| 2,231,929 | Lyman | Feb. 18, 1941 |
| 2,257,783 | Bowen | Oct. 7, 1941 |
| 2,277,464 | Taylor | Mar. 24, 1942 |
| 2,301,254 | Carnahan | Nov. 10, 1942 |
| 2,354,665 | Church et al. | Aug. 1, 1944 |
| 2,403,622 | Tuska | July 9, 1946 |
| 2,405,238 | Seeley | Aug. 6, 1946 |
| 2,409,462 | Zworykin et al. | Oct. 15, 1946 |
| 2,410,831 | Maybarduk et al. | Nov. 12, 1946 |
| 2,417,446 | Reynolds | Mar. 18, 1947 |
| 2,426,189 | Espenschied | Aug. 26, 1947 |
| 2,426,979 | Ayres | Sept. 9, 1947 |

FOREIGN PATENTS

| Number | Country | Date |
|---|---|---|
| 497,147 | Great Britain | Dec. 9, 1938 |
| 522,890 | Great Britain | July 1, 1940 |